G. W. BIGELOW.
DAMPER REGULATOR.
APPLICATION FILED MAY 8, 1911.

1,017,731.

Patented Feb. 20, 1912.

WITNESSES
Florence H. Monk
Wallace S. Moyle

INVENTOR
George W. Bigelow
BY George C. Hall
ATTORNEY

UNITED STATES PATENT OFFICE.

GEORGE W. BIGELOW, OF NEW HAVEN, CONNECTICUT.

DAMPER-REGULATOR.

1,017,731.    Specification of Letters Patent.    Patented Feb. 20, 1912.

Application filed May 8, 1911. Serial No. 625,680.

*To all whom it may concern:*

Be it known that I, GEORGE W. BIGELOW, a citizen of the United States, residing at New Haven, in the county of New Haven and State of Connecticut, have invented certain new and useful Improvements in Damper-Regulators, of which the following is a specification, reference being had therein to the accompanying drawings.

My invention relates to a new and improved damper regulator, having for its object, among other things, to provide a compact, reliable, efficient and automatic device for operating the damper in the flue so as to vary the draft in the fire box, thereby increasing or decreasing the steam pressure in the boiler; and to construct the same with particular reference to sensitiveness, simplicity, fewness of parts, and non-liability of derangement.

To these, and other ends, my invention consists in the damper regulator, having certain details of construction, and combinations of parts, as will be hereinafter described, and more particularly pointed out in the claims.

Figure 1:
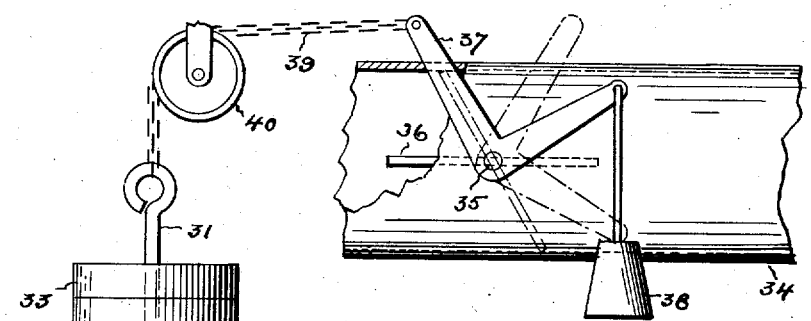
Figure 2:
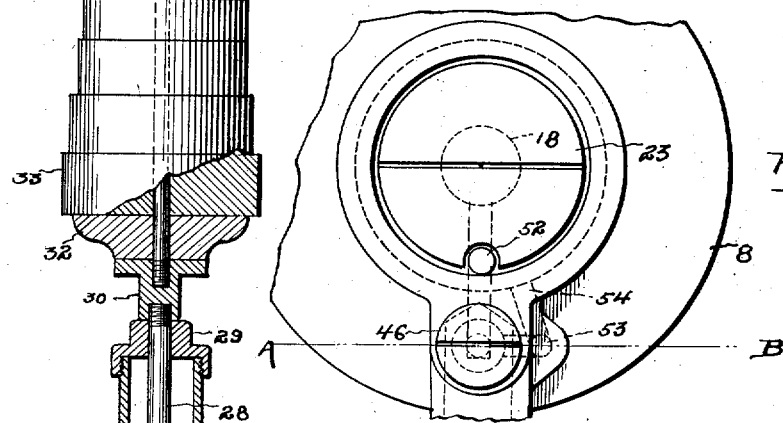
Figure 3:
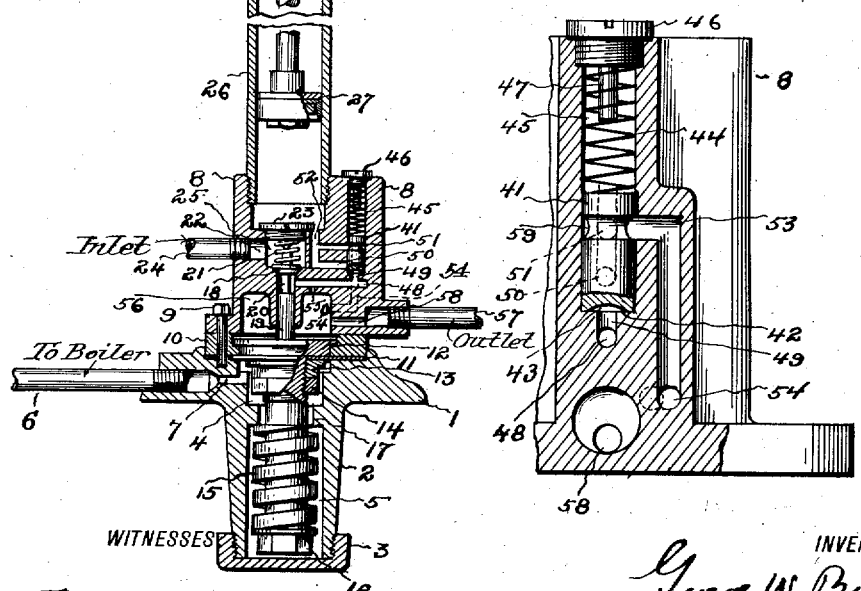

Referring to the drawings, in which like numerals of reference designate like parts in the several figures; Figure 1 is a view, partly in side elevation, of a damper regulator, constructed in accordance with my invention; Fig. 2 is a fragmentary plan view of the valve casing; and Fig. 3 is a sectional view thereof upon line A—B.

In the practice of my invention I employ a base 1, which may be secured in any desired manner to a boiler, or adjacent thereto, said base being provided with a hub 2, that is closed at its lower end by the cap 3, and having a chamber 4 therein substantially concentric with the bore 5 of the hub 2. Secured to one side of the base 1 is a pipe 6, by which either the steam or fluid in the boiler is conveyed to the chamber 4 through the port 7.

The numeral 8 designates the valve casing, which is secured to the base 1 by the screws 9, with the ring 10 and diaphragm 11 (preferably of flexible material) therebetween. Within the ring 10 and base 1 is the piston 12, the shank of which passes through an opening in the diaphragm 11 and is secured thereto by the collar 13, and nut 14, a spring 15 surrounding said shank and lying between the nut 16 and the annular shoulder 17. The tension of this spring is regulated by manipulation of the nut 16, with its normal tension such as to counterbalance the pressure of the steam or the fluid within the chamber 4, the piston 12 being then in its down position. Axially movable in the valve casing 8 is the primary valve 18, having a stem 19, provided with an annular groove 20, the bottom of said stem resting upon the top of the piston 12, and held there by the tension of the spring 21, which lies in the chamber 22 between the primary valve 18 and the plug 23 that is threaded into the open end of said chamber. Water under pressure is conveyed to the chamber 22 through the pipe 24 and port 25. Threaded into the upper end of the valve casing is the cylinder 26 having the cylinder head 29 at its opposite end, and through which is slidable the piston rod 28, having a piston head 27 thereon. Secured to the upper end of the piston rod 28 is the flanged carrier 30, having the suspension rod 31 threaded therein, and supporting a washer 32, upon which rests a plurality of weights 33 that are slotted, as is usual, to facilitate assembling the same upon the rod 31.

The flue is designated by the numeral 34, within which is mounted the shaft 35, having a damper 36, and the bell crank 37 thereon, said bell crank having a weight 38 upon one arm and a chain 39 connecting the other arm with the suspension rod 31, and passing over an idler pulley 40. Mounted within the said valve casing is the secondary valve 41 that is slightly concaved at its bottom end at 43, and rests, when closed, upon the seat 42, being held thereon by the tension of the spring 44 within the chamber 45 that lies between the upper end of said valve and the underside of the plug 46 that closes the open end of said chamber, a stop pin 47 being connected with said plug to limit the upward movement of said valve. Within said casing are the ports 48, 49, 50, 51, 52, 53 and 54, and a relief port 55 of comparatively small area, connecting the port 48 with the chamber 56, and which is connected with an exhaust pipe 57 through the port 58. The valve 41 is provided near its upper end with the annular groove 59, which registers with the ports 51 and 53 when the said valve is in its closed position. In its zero position, that is, when the fluid or steam is at the predetermined pressure, the piston 12 is held in its down position by the spring 15, and the piston head 27 by the weights 33, the primary valve 18 then being upon its seat. If the pressure within the chamber 4 is increased above the predetermined pressure, the piston 12 moves upwardly against the tension of the spring 15, thus lifting the primary valve 18 off its seat through the stem 19 and permitting water under pressure to enter the ports 48 and 49, lifting the secondary valve 41 off its seat against the tension of the spring 44. This movement of the secondary valve 41 closes the port 53 and uncovers the port 50, allowing the water to pass through the ports 50 and 52 into the cylinder 26, thereby forcing the piston upwardly, and the counterweight 38 on the crank 37 moves the damper 36 toward its closed position, thus wholly or in part shutting off the draft and reducing the steam pressure. When the pressure is reduced to its predetermined pressure, the spring 15 pulls the piston 12 downwardly and the spring 21 closes the valve 18. When the valve 18 drops onto its seat, the valve 41 performs a similar operation through the action of the spring 44, shutting off the supply of water through the port 49, and at the same time opening the port 53. The water within the cylinder 26 is then forced therefrom by reason of the weights 33 through the ports 52, 51, 53 and 54 to the chamber 56, and through the port 58 to the outlet pipe 57, during which time the damper is again opened and the draft increased. The closing of the secondary valve 41 is facilitated by the relief port 55, through which the excess water in the ports 49 and 48 is forced into the chamber 56.

There are minor changes and alterations that can be made within my invention, and I would therefore have it understood that I do not limit myself to the exact construction herein shown and described, but claim all that falls fairly within the spirit and scope of my invention.

Having described my invention, what I claim as new and desire to secure by Letters Patent, is:—

1. In a damper actuating mechanism, the combination with a casing; of a primary valve normally resting on a valve seat in said casing, and acting as a closure between the pipe connection above the primary valve and water passages within said casing; means, comprising a piston, having a physical connection with said primary valve, operated at a predetermined boiler pressure, to lift said valve off its seat; a secondary valve within said casing, arranged with reference to the aforesaid water passages, so as to admit or discharge water into or from the said casing; and a normally open outlet pipe leading therefrom, said casing being provided with a relief port between one of said water passages and said outlet pipe to relieve the pressure against said secondary valve and allow it to be seated by spring means.

2. In a damper actuating mechanism, the combination with a valve casing, having water passages therein and a normally open outlet pipe leading therefrom; of a primary valve, operative in a normally closed water chamber within said casing, and having an annular groove in the stem thereof; a spring within said chamber for holding said valve upon its seat; a secondary valve; a spring for normally holding said valve upon its seat; a water passage entering the valve casing and leading into said water chamber; a diaphragm piston controlled by the boiler pressure, and upon the upper surface of which rests the stem of the said primary valve; and a spring for returning said diaphragm piston to its rest position.

3. In a damper actuating mechanism, the combination with a valve casing, having water inlet and outlet pipes connected therewith and water passages therein; a primary valve with a stem of reduced diameter for a portion of its length movably mounted within said casing, operated in one direction by the boiler pressure, and in the other direction by water pressure with the said reduced portion of said valve stem opposite one of said water passages; a secondary valve, also movably mounted therein, and operated in one direction by the pressure of the water passing through said primary valve and connected therewith by one or more of said water passages; and a diaphragm piston, arranged so that the stem of said primary valve rests thereon.

In testimony whereof I affix my signature in presence of two witnesses.

GEORGE W. BIGELOW.

Witnesses:
GEORGE E. HALL,
H. W. HOPE.

---

Copies of this patent may be obtained for five cents each, by addressing the "Commissioner of Patents, Washington, D. C."